United States Patent
Kennedy (10) Patent No.: US 9,938,699 B2
(45) Date of Patent: Apr. 10, 2018

(54) BREAKER STRAP FOR FIRE HYDRANT BREAKER ASSEMBLY

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 0 days.

(21) Appl. No.: 15/254,162

(22) Filed: Sep. 1, 2016

(65) Prior Publication Data

US 2018/0058047 A1    Mar. 1, 2018

(51) Int. Cl.
*E03B 9/02*    (2006.01)
*E03B 9/04*    (2006.01)
*F16L 23/02*   (2006.01)
*F16B 7/04*    (2006.01)

(52) U.S. Cl.
CPC .............. *E03B 9/04* (2013.01); *F16B 7/0426* (2013.01); *F16L 23/02* (2013.01); *Y10T 137/0407* (2015.04); *Y10T 137/5327* (2015.04)

(58) Field of Classification Search
CPC .......... E03B 9/04; F16B 7/0426; F16L 23/02; Y10T 137/0407; Y10T 137/5327–137/5538; Y10T 137/1632; Y10T 137/1662; Y10T 137/1669
USPC .............. 137/15.02, 272–308, 68.14, 68.15; 285/1–3
See application file for complete search history.

(56) References Cited

U.S. PATENT DOCUMENTS

| | | | | |
|---|---|---|---|---|
| 1,944,777 A * | 1/1934 | Banks | ...... | E03B 9/02 137/272 |
| 2,017,600 A * | 10/1935 | Lofton | ...... | E03B 9/02 137/15.02 |
| 2,085,074 A * | 6/1937 | Boyles | ...... | E03B 9/02 137/272 |
| 2,249,848 A * | 7/1941 | O'Brien | ...... | E03B 9/02 137/272 |
| 2,282,641 A * | 5/1942 | Corey | ...... | E03B 9/02 137/272 |
| 3,331,397 A * | 7/1967 | Mueller | ...... | E03B 9/04 137/797 |
| 3,439,938 A * | 4/1969 | Dunton | ...... | E03B 9/04 137/301 |
| 3,899,196 A * | 8/1975 | Dashner | ...... | E03B 9/04 285/2 |
| 4,717,178 A * | 1/1988 | Daghe | ...... | E03B 9/04 285/4 |
| 4,748,997 A * | 6/1988 | Ragsdale | ...... | E03B 9/04 137/15.02 |
| 5,099,565 A * | 3/1992 | Campbell | ...... | E03B 9/04 137/15.02 |

(Continued)

OTHER PUBLICATIONS

Mueller Co. Fire Hydrant Misc. Equipment and Repair kits, at least as early as Apr. 26, 2016.

(Continued)

*Primary Examiner* — Craig J Price
(74) *Attorney, Agent, or Firm* — Brown & Michaels, PC (57) ABSTRACT

Breaker straps, preferably made of steel, include holes that line up with the holes in breaker rings, to keep the breaker rings in place on a fire hydrant. A collision kit includes breaker straps, the breaker rings, a coupling, and coupling pins.

10 Claims, 7 Drawing Sheets

(56) References Cited

U.S. PATENT DOCUMENTS

5,211,685 A    5/1993  Garcia
8,991,415 B1   3/2015  Luppino

OTHER PUBLICATIONS

Guardian K-81D Hydrant Kennedy Valve, 2011.
The Kennedy Guardian, Feb. 14, 2012.

* cited by examiner

BREAKER STRAP FOR FIRE HYDRANT BREAKER ASSEMBLY

BACKGROUND OF THE INVENTION

Field of the Invention

The invention pertains to the field of fire hydrants. More particularly, the invention pertains to improved safety features to allow an above ground hydrant assembly to separate cleanly from a standpipe without damage in the event of vehicular or other impact.

Description of Related Art

Fire hydrants preferably include a breakable mechanism that activates after an impact from another object, for example when vehicles collide with a fire hydrant. One prior art breakable mechanism is a breaker flange which includes a continuous ring with a snap ring. A second mechanism uses a hinge and a pin.

Another prior art breakable mechanism includes two half-moon safety flange rings and a stem coupling. Upon vehicular impact, the safety flange ring fractures to allow the above ground hydrant assembly to separate cleanly from the standpipe without damage to internal parts or loss of water. This prior art breaker assembly relies on friction to keep the safety flange rings correctly located. The safety flange rings are difficult to get into place, and are generally slightly skewed.

SUMMARY OF THE INVENTION

Breaker straps, preferably made of steel, include holes that line up with the holes in breaker rings, to keep the breaker rings in place on a fire hydrant. A collision kit includes breaker straps, the breaker rings, a coupling, and coupling pins.

DETAILED DESCRIPTION OF THE INVENTION

Breaker straps, preferably made of metal, include holes that line up with the holes in the safety flange rings, also known as breaker rings, to keep the breaker rings in place on a fire hydrant. A collision kit includes breaker straps, breaker rings, a coupling, and coupling pins.

Two breaker straps connect the ends of the two breaker rings. The curve of the breaker straps generally matches the curve of the breaker ring. The breaker straps pick up the last hole in each side of the two half-moon breaker rings. The straps under the head of the bolt or other fastener keep the breaker rings in place. This is similar to chain couplings in chain links. The breaker straps are preferably made of metal, such as a sheet metal stamping.

A ledge on the upper barrel of the fire hydrant is often tapered or beveled at an angle of 15 degrees. With the addition of the breaker straps, the breaker rings are able to better ride out the angle. In other words, when the breaker rings are tightened, they tighten at an angle on the barrel, and the straps prevent the breaker rings from sliding.

The straps keep the breaker rings in place. The bolt or other fastener goes through the breaker ring, the breaker strap and into a hole in the flange on the top of the lower barrel of the fire hydrant.

A novel breaker collision kit includes two breaker rings, two breaker straps and a breakable stem coupling. The kit also preferably includes fasteners, such as coupling pins. The collision kit may also include one or more O-rings, gaskets, or other seals. The collision kit may also include screws and/or nuts. For hydrants not equipped with stop nuts on the upper stem, a stop nut may also be included in the collision kit.

Figure 1A:
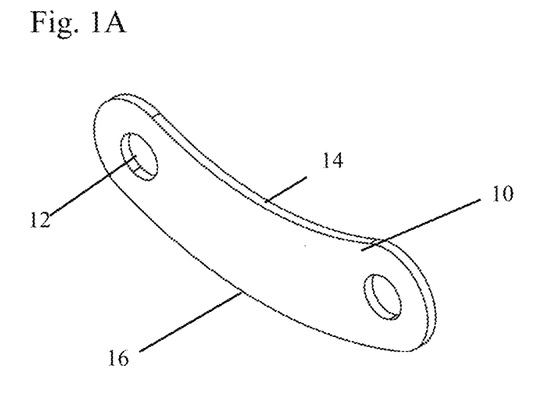
FIG. 1A shows a perspective view of the breaker strap.
Figure 1B:
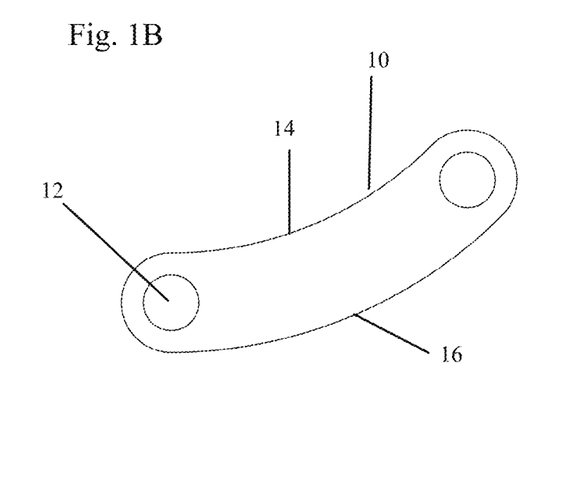
FIG. 1B shows a front view of the breaker strap.
Figure 1C:
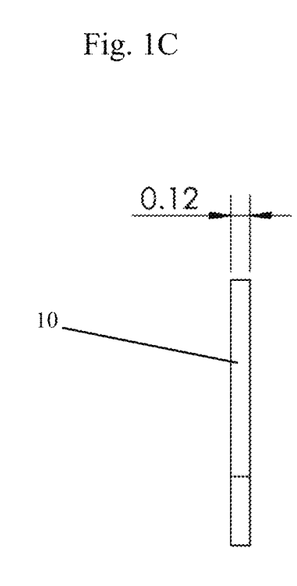
FIG. 1C shows a side view of the breaker strap with a preferred thickness dimension.
Figure 1D:
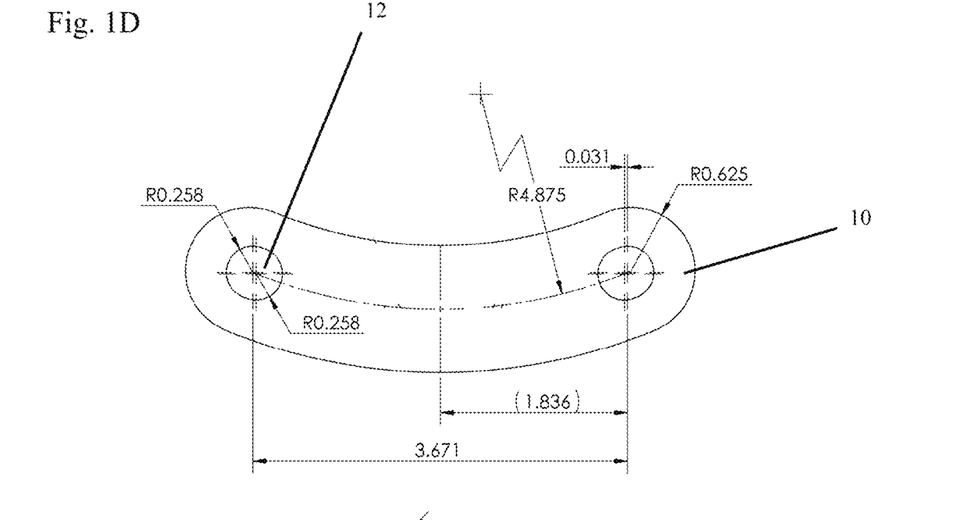
FIG. 1D shows a view of the breaker strap with some preferred dimensions for a fire hydrant with a 5¼ inch main valve opening.
Figure 1E:
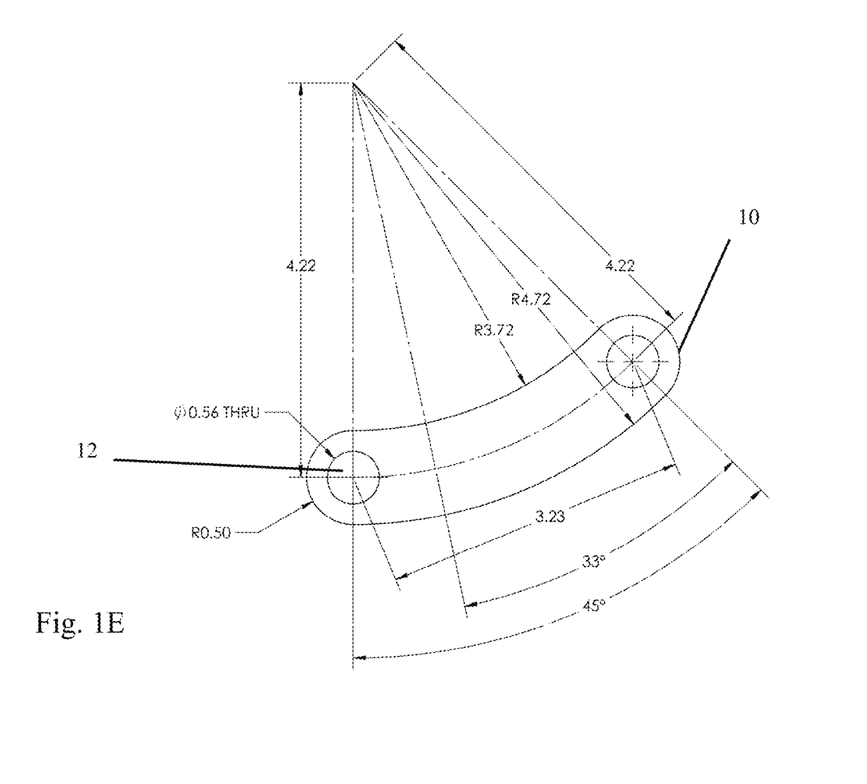
FIG. 1E shows a view of the breaker strap with some preferred dimensions for a fire hydrant with a 4½ inch main valve opening.

FIGS. 1A and 1B show a breaker strap 10. The breaker strap 10 is curved, with a concave shaped top 14 and a convex shaped bottom 16. Some examples of preferred dimensions (in inches) for the breaker strap 10 are shown in FIGS. 1C, 1D and 1E. However, the breaker straps 10 may have different dimensions than those shown in these figures, depending upon the fire hydrant and breaker assembly which with they are used. The breaker rings, or safety flange rings 20 are preferably made out of cast iron. The breaker straps 10 are preferably made of steel.

FIGS. 2A, 2B, 3, and 4 show a fire hydrant 1 with breaker straps 10. The fire hydrant 1 includes a fitting 80, preferably made by Alemite LLC (St. Louis, Mo.), and a fastener 82, 86 such as an Allen head set screw 82 and a nut 86. A dirt shield 2 fits onto a hydrant cap 42. Cap fasteners 44, such as bolts and nuts, fasten the hydrant cap 42 to the upper barrel 58. The hydrant also includes an o-ring 34 and a hydrant cap gasket 32. A washer 6, for example a thrust washer, facilitates the connections in the cap portion of the fire hydrant. O-rings 3, 4 seal various portions of the fire hydrant 1.

An operating stem nut 84 connects the upper stem 54 to the cap portions of the fire hydrant 1. The upper stem 54 is located in the center of the upper barrel 58 and the lower stem 52 is located in the center of the lower barrel 60. An o-ring 46 creates a seal between the upper barrel 58 and the lower barrel 60. A stem ferrule, ring or cap 8 is preferably located on an upper end of the upper stem 54. A stem breaker coupling 30 is located between the upper stem 54 and the lower stem 52. The stems 52, 54 are fastened to the coupling 30 with coupling pins 40. The coupling 30 is preferably located directly above the ground line 104.

Figure 3:
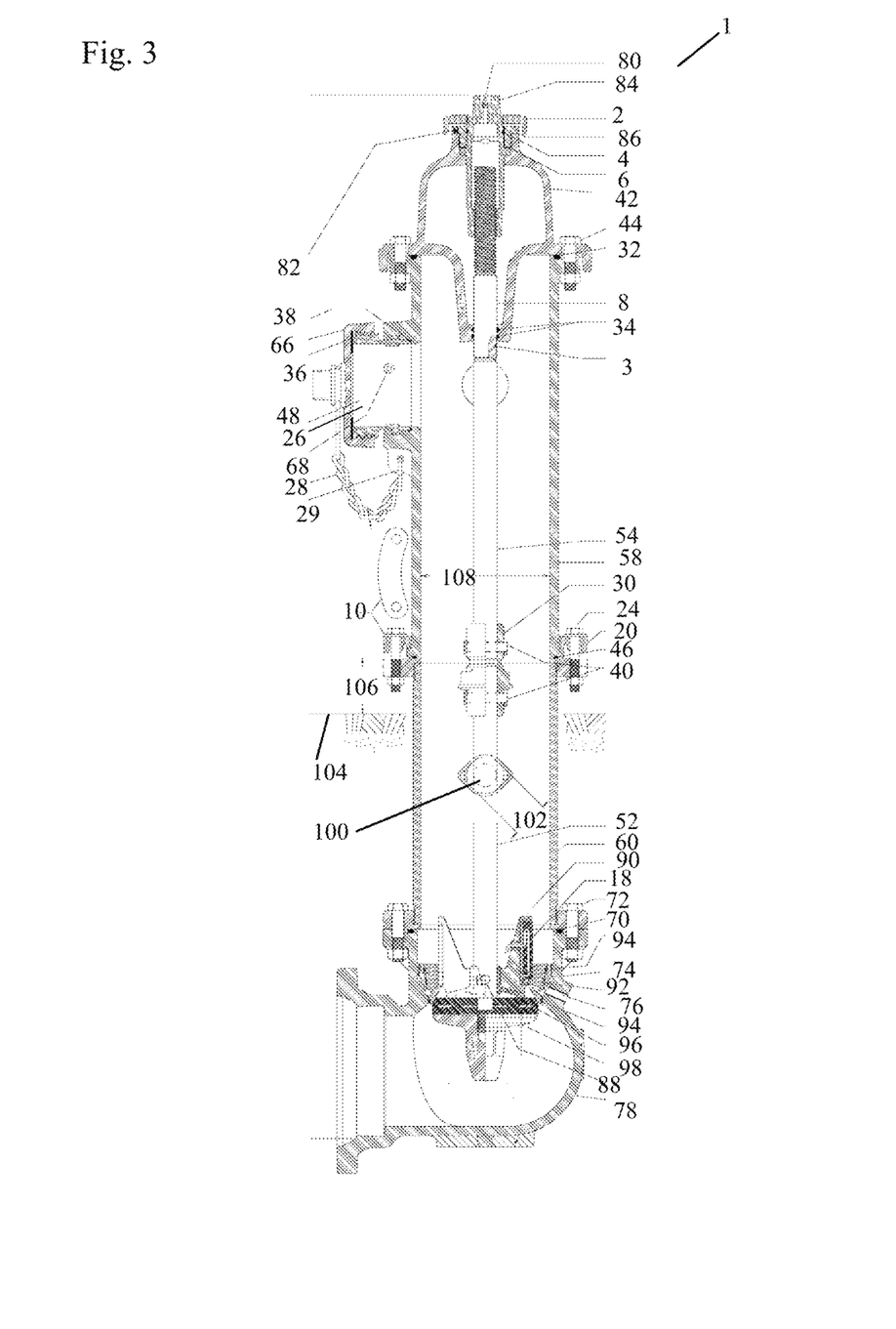
FIG. 3 shows a cross-sectional view of a fire hydrant in an embodiment of the present invention.
Figure 4:
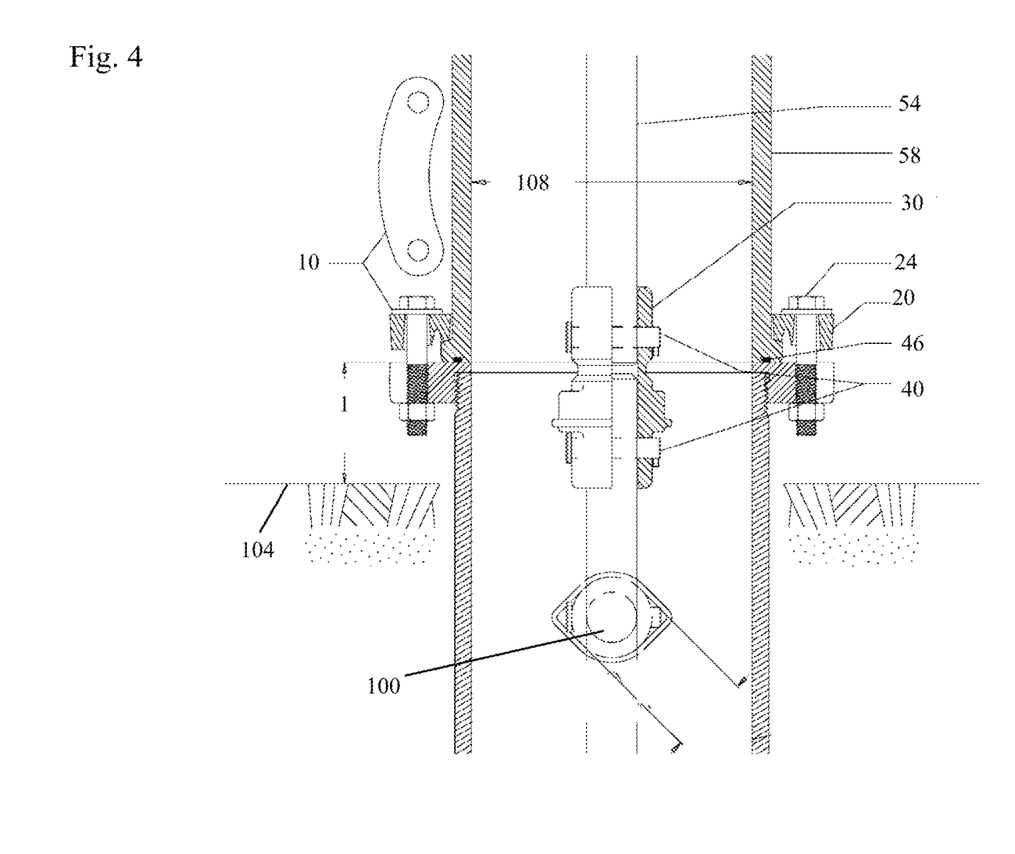
FIG. 4 shows a close up cross-sectional view of the breaker mechanism of the fire hydrant of FIG. 3.

A bottom end view of the stem breaker coupling 100 and a wrench square 102 can be seen in FIG. 3. FIG. 3 also shows a distance 106 between the coupling 30 and the ground line 104. In some fire hydrants, this distance is approximately three inches. In some hydrants, the width 108 of the fire hydrant is 7 inches. Some preferred dimensions for the hydrant include a distance of approximately 18 inches between a center of the nozzle cap 66 and the ground line 104 and approximately 33½ inches between the ground line 104 and a top of the fire hydrant 1.

There are two breaker straps 10 and two breaker rings 20. Each breaker strap 10 connects to the ends of the two breaker rings 20. The curve of the breaker straps 10 matches the curve of the breaker rings 20. The bolt or other fastener 24 goes through the holes 22 in the breaker ring 20, the holes 12 in the breaker strap 10, and into a hole 64 in the flange 62 of the lower barrel 60. The breaker straps 10 pick up the outer holes 22 in each side of the two half-moon breaker rings 20.

The straps 10 under the head of the bolt or other fastener 24 keep the breaker rings 20 in place. This is similar to chain couplings in chain links. The breaker straps 10 are preferably made of metal, such as a sheet metal stamping. The ledge 50 is often tapered, for example beveled 15 degrees. With the breaker straps 10, the breaker rings 20 are able to better ride out the angle and the breaker straps 10 keep the breaker rings 20 in place.

Figure 2A:
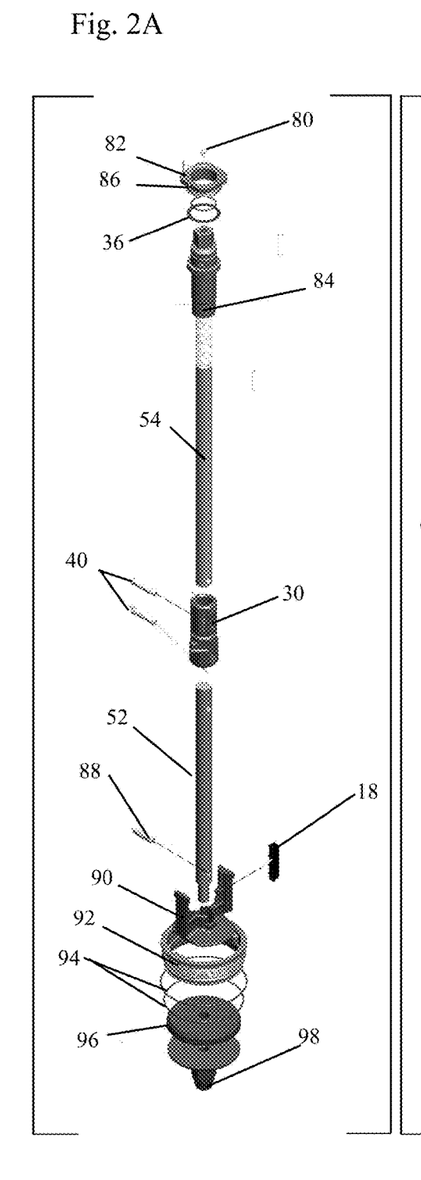
FIG. 2A shows interior components of a fire hydrant in an embodiment of the present invention.
Figure 2B:
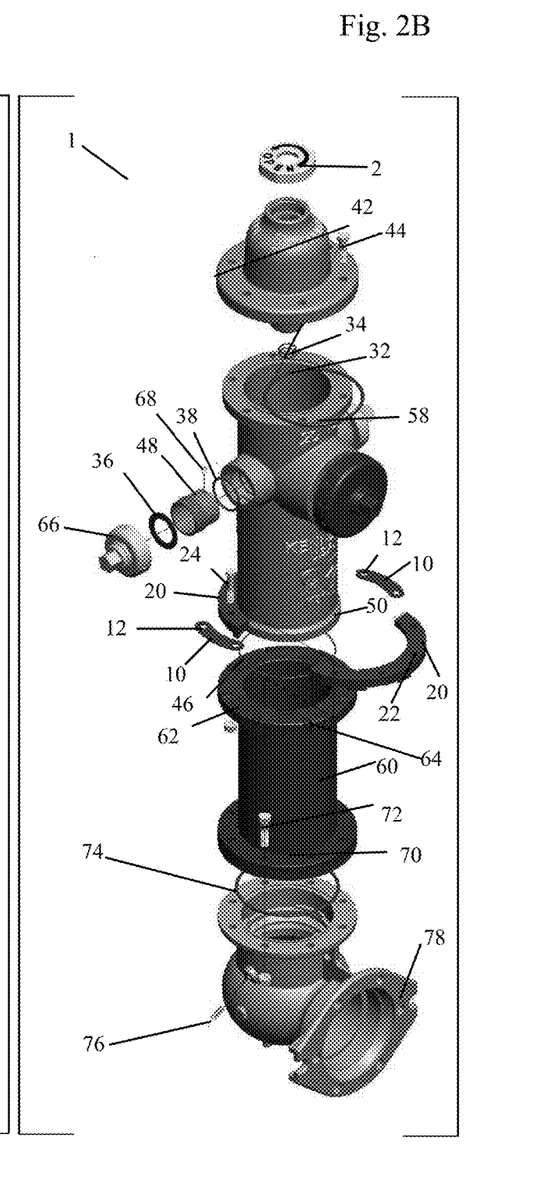
FIG. 2B shows exterior components of the fire hydrant of FIG. 2A.

The hose nozzle 26 of the fire hydrant 1 includes a nozzle 48, an o-ring 38, a nozzle cap 66, a nozzle cap gasket 36, and a nozzle retaining screw 68. The nozzle 26 also preferably includes a nozzle cap chain 28 and a nozzle chain hook 29, for example an S-hook, which connects one end of the chain 28 to the body of the fire hydrant 1.

An elbow 78 includes a seal 70 and fasteners 72. The fire hydrant 1 also includes a drain tube 76. A drain valve 90 includes a drain valve pin 88, and a drain valve facing with inserts 18. A seat ring 92 includes a seat ring insert 74. Seals, such as O-rings 94, seal the seat ring 92 to the main valve 96. A bottom plate 98 sits within the elbow 78. In FIG. 3, the drain holes in the drain tube 76 are shown rotated 90 degrees. The elbow (shoe) 78 and bottom plate 98 are preferably epoxy coated in accordance with regulations.

Figure 5:
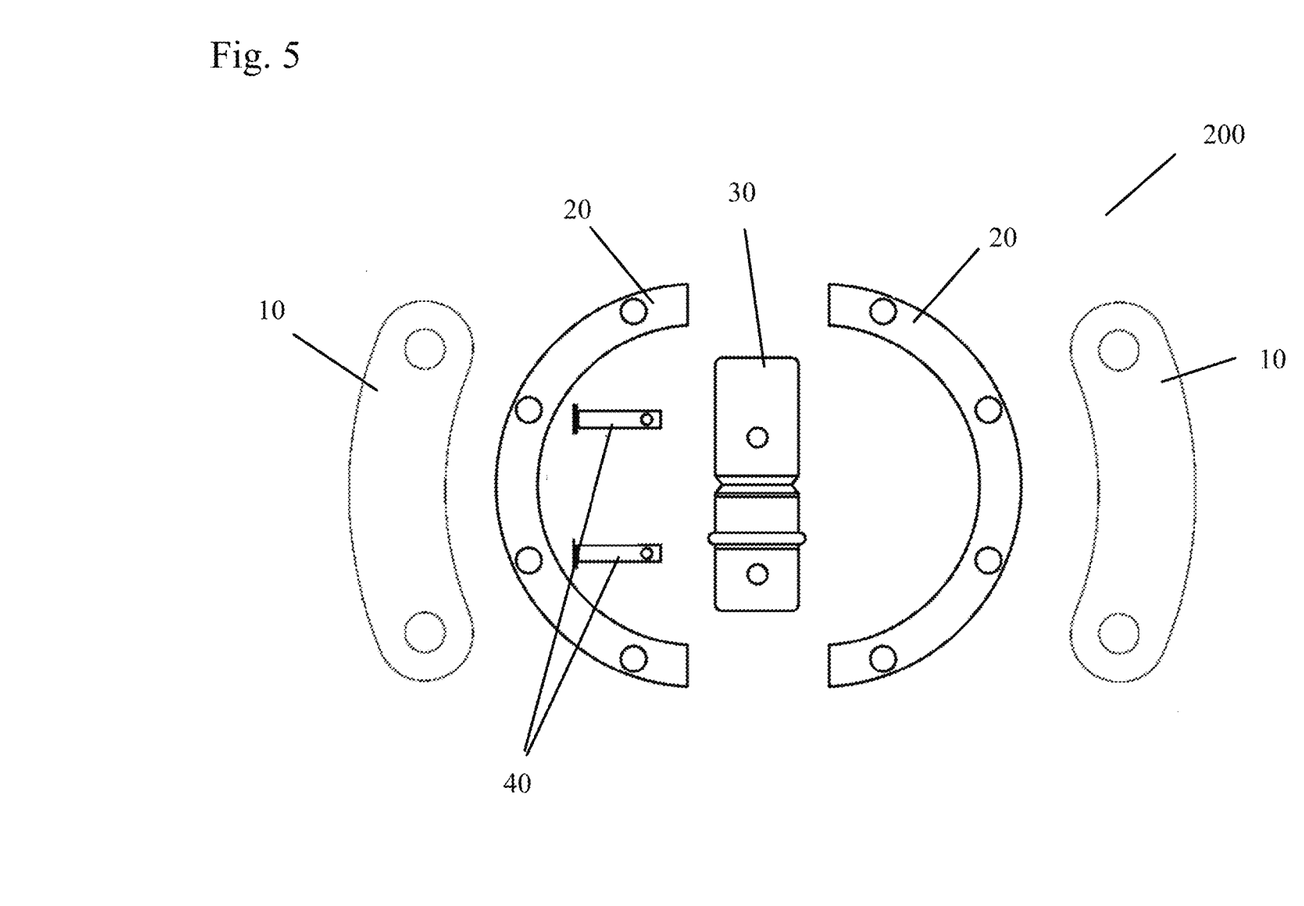
FIG. 5 shows a collision repair kit including the breaker straps described herein.

A collision repair kit 200 is shown in FIG. 5. This kit preferably includes a stem breaker coupling 30, two breaker rings 20, two coupling pins 40, a breaker coupling 30 and an instruction sheet (not shown) on how to repair the fire hydrant. While not shown in FIG. 5, the kit may also include a flange seal O-ring 46, a gasket hydrant cap 32, and/or additional fasteners. As an example of the additional fasteners included, the kit may include eight hex head plated, 12.7 mm×69.85 mm (½"×2¾") screws and eight finished hex plated, 12.7 mm (½") nuts. Tools required may depend on the model of fire hydrant being repaired, but may include a spanner wrench with the proper sized operating nut opening, a hammer, pliers, a 9.525 mm (⅜" or ½") drive ratchet with 19.05 mm (¾") socket and 19.05 mm (¾") open or box end wrench or two 19.05 mm (¾") open or box end wrenches.

Figure 6:
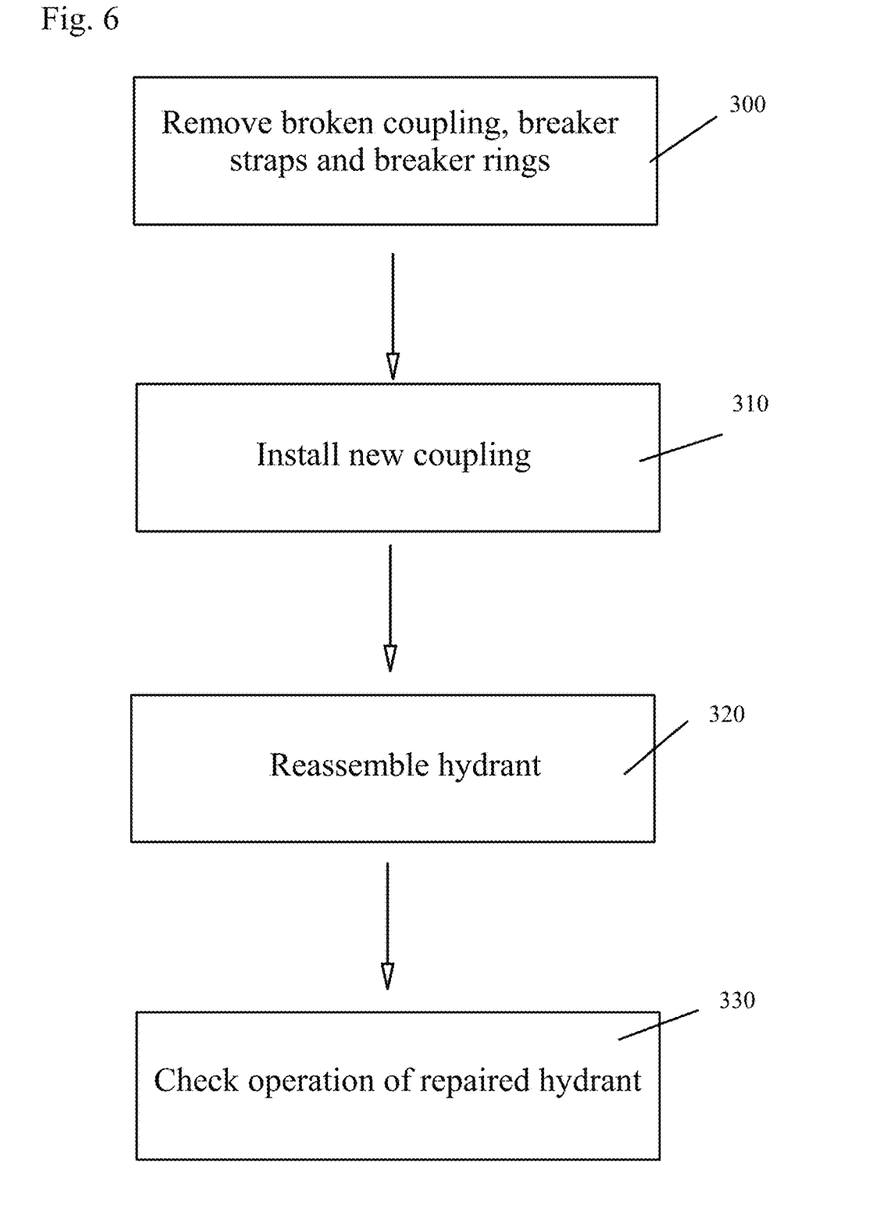
FIG. 6 shows a method of repairing a fire hydrant.

FIG. 6 shows a method of repairing a fire hydrant after impact. To repair broken couplings, remove the broken stem breaker coupling 30, breaker straps 10 and standpipe breaking rings 20 in step 300. For hydrants not equipped with stop nuts on the upper stem, a stop nut may be furnished. Then, remove the broken stem breaker coupling 30 from the lower stem 52 and remove the lower coupling 30. With a socket wrench, remove the coupling pins 40 holding the broken breaking rings 20 and remove the pieces, which also include the breaker straps 10. Lay the upper portion of the fire hydrant safely on the ground. To remove the stem 54 from the upper portion of the hydrant, unscrew the upper stem 54 from the operating nut 56 by holding the stem 54 stationary and turning the operating nut 56 in the direction to open. Remove the broken upper stem breaker coupling 30 and the upper coupling pin 40.

To install a new stem coupling 30 in step 310, place a new stem breaker coupling 30 on the upper stem 54 and secure with the upper coupling pins 40 provided. Slide the upper stem 54 and coupling assembly 30 over the lower stem 52, push in the lower coupling clevis pin 40 and fasten with the bridge pin 40. To remove the cap 42 from the upper portion of the hydrant 1, place the upper barrel 58 of the hydrant 1 on a clean surface, such as cardboard. With a socket wrench, remove the bolts 44 holding the cap 42 to the upper barrel 58 and remove the cap 42.

To reassemble the hydrant in step 320, check the O-ring 46 on the bottom of the hydrant upper barrel 58 and replace it if it is damaged using the collision kit. Set the hydrant upper barrel 58 over the stem 54 and orient the nozzles 48 in the direction required. Place the breaker rings 20 on the flange 62 of the lower barrel 60 and around the upper barrel 58. Align the holes 12 in the breaker straps 10 with the holes 22 in the breaker rings 20 Replace the bolts 24 in the breaker rings 20 and breaker straps, aligning the holes 22 in the breaker rings with the holes 12 in the breaker straps 10 and placing the breaker straps 10 directly below the head of the fasteners 24.

Replace the hydrant cap gasket 32 and lower the cap 42 over the upper stem 54. Be careful not to damage the O-rings 34 in the cap 42. Start the upper stem 54 into the operating nut 56 by turning the operating nut 56 in the direction to close. Turn until the cap 42 is seated on the upper barrel 58. Replace the cap bolts 44 and tighten. Tighten the coupling pins 40 evenly to approximately 20.16-30.24 m/kg (30-45 ft. per pound). Check for free operation in step 330 by cycling the hydrant 1 from fully open to fully closed.

While a specific design for a fire hydrant 1 is shown in the figures, other fire hydrant models that use a breaking assembly to withstand vehicular or other impacts could use the breaking straps 10 described herein. Although O-rings and gaskets are described throughout to provide seals between mating surfaces in the fire hydrant, other alternative mechanical seals known in the art may be used.

| Reference Numeral List: | |
| --- | --- |
| 1 hydrant | 54 upper stem |
| 2 dirt shield | 58 upper barrel |
| 3 O-ring | 60 lower barrel |
| 4 O-ring | 62 flange on lower barrel |
| 6 washer | 64 holes on flange |
| 8 stem ferrule | 66 nozzle cap |
| 10 breaker strap | 68 nozzle retaining screw |
| 12 breaker strap holes | 70 elbow seal |
| 14 breaker strap top | 72 elbow fasteners |
| 16 breaker strap bottom | 74 seat ring insert |
| 18 drain valve facing with insert | 76 drain tube |
| 20 breaker ring | 78 elbow |
| 22 breaker ring outer holes | 80 fitting |
| 24 breaker ring bolts | 82 screw |
| 26 hose nozzle | 84 operating stem nut |
| 28 nozzle cap chain | 86 stem lock nut |
| 29 nozzle chain S hook | 88 drain valve pin |
| 30 stem breaker coupling | 90 drain valve |
| 32 hydrant cap gasket | 92 seat ring |
| 34 O-rings | 94 O-ring |
| 36 nozzle cap gasket | 96 main valve |
| 38 O-rings in nozzle | 98 bottom plate |
| 40 coupling pins | 100 bottom end view of breaker coupling |
| 42 cap | |
| 44 cap fasteners | 102 wrench square |
| 46 O-ring | 104 ground line |
| 48 nozzle | 106 distance to ground |
| 50 ledge | 108 hydrant width |
| 52 lower stem | 200 collision repair kit |

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A breaker mechanism for repair of a fire hydrant upon impact, wherein the fire hydrant comprises a hollow upper barrel comprising an outer bottom ledge, an upper stem located on a center axis of the upper barrel, a hollow lower barrel comprising an upper flange, and a lower stem located on a center axis of the lower barrel, comprising:
   a) two half-moon shaped breaker rings shaped to sit on the outer bottom ledge of the upper barrel and having a plurality of holes;
   b) two curved breaker straps having a plurality of holes and shaped to connect the two breaker rings, wherein the holes are placed to line up with outermost holes of the breaker rings and holes in the upper flange;
   c) a stem breaker coupling partially located within the upper barrel and partially located within the lower barrel that couples the upper stem to the lower stem such that a bottommost portion of the upper stem and a topmost portion of the lower stem are located within a hollow chamber of the breaker coupling;
   d) a first coupling pin to connect the stem breaker coupling to the upper stem; and
   e) a second coupling pin to connect the stem breaker coupling to the lower stem.

2. The breaker mechanism of claim 1, further comprising at least one mechanical seal located between the upper barrel and the lower barrel.

3. The breaker mechanism of claim 1, further comprising a cap located above the upper barrel and at least one mechanical seal located between the upper barrel and the cap.

4. A collision repair kit for a fire hydrant comprising a hollow upper barrel comprising an outer bottom ledge, an upper stem located on a center axis of the upper barrel, a hollow lower barrel comprising an upper flange, and a lower stem located on a center axis of the lower barrel, the collision repair kit comprising:
   a) two half-moon shaped breaker rings shaped to sit on the outer bottom ledge of the upper barrel and having a plurality of holes;
   b) two curved breaker straps shaped to connect the two breaker rings, wherein the holes are placed to line up with outermost holes of the breaker rings and holes in the upper flange;
   c) a stem breaker coupling that couples the upper stem to the lower stem such that a bottommost portion of the upper stem and a topmost portion of the lower stem are located within a hollow chamber of the breaker coupling;
   d) a first coupling pin to connect the stem breaker coupling to the upper stem; and
   e) a second coupling pin to connect the stem breaker coupling to the lower stem.

5. The collision repair kit of claim 4, further comprising at least one seal shaped to seal the upper barrel to the lower barrel.

6. The collision repair kit of claim 4, further comprising at least one seal shaped to seal the upper barrel to a cap of the fire hydrant.

7. A method of repairing a fire hydrant after an impact, wherein the hydrant comprises a hollow upper barrel comprising an outer bottom ledge, an upper stem located on a center axis of the upper barrel, a hollow lower barrel comprising an upper flange, a lower stem located on a center axis of the lower barrel, and a breaker mechanism comprising two half-moon shaped breaker rings shaped to sit on the outer bottom ledge of the upper barrel and having a plurality of holes, two curved breaker straps having a plurality of holes and shaped to connect the two breaker rings, wherein the holes are placed to line up with outermost holes of the breaker rings and holes in the upper flange, a stem breaker coupling that couples the upper stem to the lower stem such that a bottommost portion of the upper stem and a topmost portion of the lower stem are located within a hollow chamber of the breaker coupling, a first coupling pin to connect the stem breaker coupling to the upper stem, and a second coupling pin to connect the stem breaker coupling to the lower stem, the method comprising the steps of:
   a) removing a broken stem breaker coupling, the breaker straps and the breaker rings;
   b) installing a new stem breaker coupling; and
   c) reassembling the fire hydrant.

8. The method of claim 7, further comprising the step of checking the fire hydrant for correct operation after reassembly.

9. The method of claim 7, wherein step c) comprises the substep of installing new breaker straps and new breaker rings by aligning a hole on each end of the breaker straps with a hole on an end of the breaker rings and placing fasteners in the holes of the breaker straps, the breaker rings and holes in the upper flange.

10. The method of claim 7, wherein step c) comprises the substep of replacing a seal on a bottom of the lower barrel.

* * * * *